United States Patent [19]

Case et al.

[11] E Re. 29,913

[45] Reissued Feb. 20, 1979

[54] FLUID ACTUATED BRAKE LOCKING MECHANISM

[76] Inventors: Walter Case, 10426 Desdemona St.; William F. Benefield, 10351 Fern Dr., both of Dallas, Tex. 75228

[21] Appl. No.: 783,424

[22] Filed: Mar. 31, 1977

Related U.S. Patent Documents

Reissue of:

[64] Patent No.: 3,874,747
Issued: Apr. 1, 1975
Appl. No.: 402,891
Filed: Oct. 3, 1973

U.S. Applications:

[63] Continuation-in-part of Ser. No. 179,751, Sep. 13, 1971, abandoned.

[51] Int. Cl.[2] ..... B60T 17/16

[52] U.S. Cl. ..... 303/89; 92/24; 188/265

[58] Field of Search ..... 303/89; 188/67, 265, 188/170; 137/598; 192/3 H, 91 R; 74/528; 92/24, 25, 27, 28; 91/45

[56] References Cited

U.S. PATENT DOCUMENTS

| | | | |
|---|---|---|---|
| 1,176,625 | 3/1916 | Tyson | 188/163 |
| 1,295,020 | 2/1919 | Fallek | 188/163 |
| 2,041,065 | 5/1936 | Hemphill | 303/89 X |
| 2,099,453 | 11/1937 | Searle | 303/89 |
| 2,108,182 | 2/1938 | Searle | 91/45 X |
| 2,121,366 | 6/1938 | Robinson | 303/89 X |
| 2,579,616 | 12/1951 | Sahlgaard | 303/89 |
| 3,182,566 | 5/1965 | Berg et al. | 92/24 |
| 3,282,169 | 11/1966 | Leighton | 92/24 |
| 3,312,314 | 4/1967 | Peters | 188/265 X |
| 3,482,666 | 12/1969 | Case et al. | 188/265 |

FOREIGN PATENT DOCUMENTS

| | | | |
|---|---|---|---|
| 1204533 | 4/1960 | Fed. Rep. of Germany | 92/24 |
| 1162215 | 1/1964 | Fed. Rep. of Germany | 188/265 |

*Primary Examiner*—Galen L. Barefoot
*Assistant Examiner*—Douglas C. Butler
*Attorney, Agent, or Firm*—Kenneth R. Glaser

[57] ABSTRACT

A brake locking mechanism for heavy vehicles, adapted to be installed in existing braking systems without altering the normal operation thereof, functions to prevent involuntary movement of the vehicle, due to system failure such as air or hydraulic fluid leakage, while standing. The mechanism includes a spring biased pawl engageable with rack teeth formed on the diaphragm actuated brake rod, the pawl being operated by an air or hydraulically actuated piston associated therewith and connected into the vehicle air or hydraulic system.

10 Claims, 6 Drawing Figures

FLUID ACTUATED BRAKE LOCKING MECHANISM

Matter enclosed in heavy brackets [ ] appears in the original patent but forms no part of this reissue specification; matter printed in italics indicates the additions made by reissue.

REFERENCE TO RELATED APPLICATION

This application is *a reissue of Pat. No. 3,874,747 and* a continuation-in-part of application Ser. No. 179,751, filed Sept. 13, 1971, now abandoned.

BACKGROUND AND SUMMARY OF THE INVENTION

This invention relates to brake systems for heavy vehicles, such as trucks, road tractors, trailers, and the like, and it has particular reference to a semi-automatic mechanism by which the brakes on a standing vehicle can be positively set and locked, and maintained locked independently of the air or hydraulic system for normal vehicle braking. The invention is related to that disclosed in U.S. Pat. No. 3,482,666, to Walter Case and William Frank Benefield, dated Dec. 9, 1969.

An object of the invention is to provide a safe and dependable mechanism by which the brakes of a heavy vehicle, when set by air or hydraulic pressure, can be readily and easily locked and maintained against involuntary release to prevent accidental movement of the vehicle while parked or standing.

Another object of the invention is to provide a simple, rugged, and economical device which can be readily installed on existing equipment by a mechanic of ordinary skill.

Yet another object of the invention is to provide a mechanism which is self-adjusting and capable of maintaining maximum efficiency of the brakes at all times, by compensating for brake band wear and loss of actuating fluids.

A further object of the invention is to provide a brake locking mechanism having manual means for disengaging the mechanism in the event of failure of the fluid system.

These objects are accomplished in a brake locking mechanism for use with a fluid operated brake system which includes, for each wheel unit, a brake, actuator chamber and a brake actuator rod operatively connected to the wheel unit brake and which is reciprocated by said brake actuator chamber. The locking mechanism includes a casing adapted to be mounted in association with the actuator chamber, and having a first passage therethrough for accommodating the brake actuator rod for reciprocating movement, and a second passage transverse to and communicating with the first passage. The brake actuator rod is provided with longitudinally spaced transverse teeth; and a pawl rod is supported and guided for reciprocating movement in the second passage, the pawl rod having pawl means at one end for engagement with the rack teeth. The casing includes a cylinder chamber, with a piston being disposed in the chamber for reciprocating movement. Means is provided for coupling the piston means to the pawl rod. A spring is coupled to the pawl rod for urging the pawl rod in a first direction relative to the first passage, to engage the pawl means with the rack teeth; and conduit means is provided for introducing pressurized fluid into the cylinder to act on the piston for urging the pawl rod in a second direction relative to the first passage, to disengage the pawl means from the rod teeth.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

Figure 3:
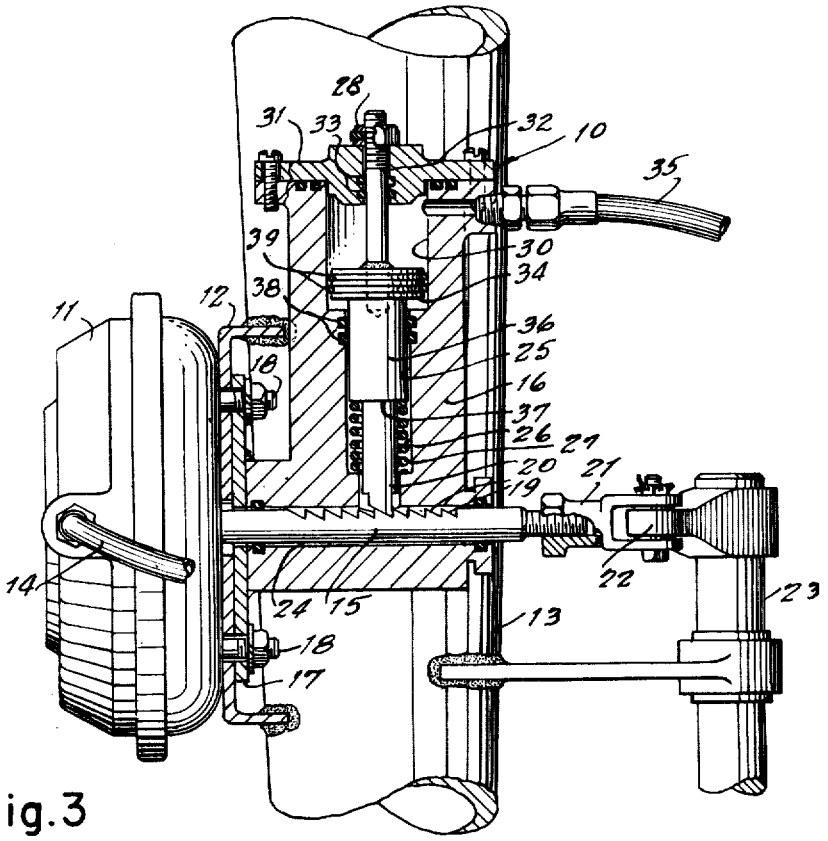
FIG. 3 is a fragmentary plan view of the assembly of FIG. 1 showing the brake actuator chamber and brake crank rod mounted on the axle housing and including a transverse sectional view of the brake locking mechanism as viewed from the line 3—3 of FIG. 2.
Figure 2:
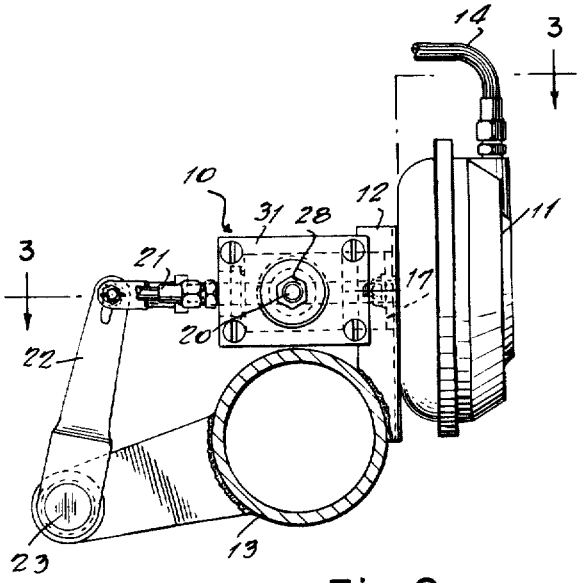
FIG. 2 is an elevation view, as viewed from the plane 2—2 of FIG. 1, showing the axle housing in section, and showing the mounting for the brake chamber, brake locking mechanism, and brake crank rod.
Figure 1:
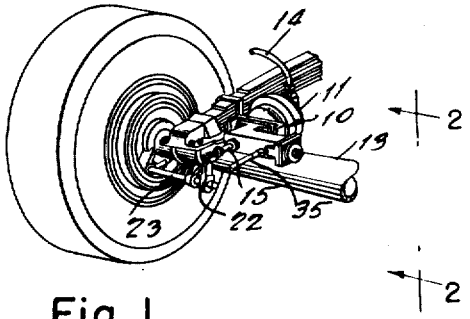
FIG. 1 is a fragmentary perspective view of a typical rear axle assembly for a semi-trailer, including an air brake actuator chamber mounted on the axle housing and a brake locking mechanism according to the invention associated therewith.

FIGS. 1, 2 and 3 illustrate one form of brake locking unit 10, according to the invention, which is connected into a conventional air brake setting mechanism of a conventional type of road tractor, truck or trailer. The brake setting mechanism includes an actuator chamber 11, attached to a mounting bracket 12 on the axle housing 13 by means of bolts 18, and has an air conduit 14 connected thereto from the vehicle compressed air source (not shown). The brake actuator rod 15 extends from the actuator chamber 11, having one end secured to and actuated by a diaphragm within the chamber 11 which effects reciprocation of the actuator rod. The actuator rod extends through a bore in the casing 16 of the locking mechanism 10 and its other end is connected through a linkage 21 to a crank arm 22 which is fixed to the outer end of a brake rod 23 which operates the brake bands. The crank rod is rotatably supported in a bearing bracket secured to the axle housing 13.

The unit 10 includes a bracket 17 fixed to casing 16, by means of which the unit is attached to the axle mounting bracket 12, in association with the chamber 11. As best seen in FIG. 3, the brake actuator rod passes through a bore 24 within the casing 16, which provides sufficient clearance for free reciprocation thereof; and this casing bore may be provided with O-ring seals to prevent dirt from entering the bore. To accommodate the brake actuator rod 15 of the conventional brake setting system to the brake locking mechanism of the invention, the rod is provided with a series of rack teeth 19 formed transversely thereof along a length of the rod which will remain within the bore 24 in operation. These rack teeth may be milled in one face of the actuator rod, as shown in FIG. 3, or may be annular teeth encircling the rod for example.

Referring now to the brake locking mechanism of the invention, the casing [10] *16* is provided with a bore 25 which is perpendicular to the bore 24 and which intersects this bore. A pawl rod 20 is disposed within the bore 25; and the lower end of the pawl rod as seen in FIG. 3 is provided with a wedgeshaped pawl-end for engagement with the rack teeth of the actuator rod 15. These rack teeth have a saw-tooth configuration; and the coacting relationship of the rod teeth and pawl is to lock the rod against movement toward the actuator chamber 11.

The bore 25 includes an enlarged chamber 26 to accommodate a compression spring 27 which surrounds the pawl rod 20. The outer end of the enlarged chamber 26 is further enlarged to define a cylinder chamber 30 whose outer end is closed by a cap 31 through which the outer end of the pawl rod 20 is slidably operated. The cap 31 has a bore 32 centrally thereof to accommodate the rod 20, and has a plurality of O-rings 33 therein as a seal about the rod 20, as shown in FIG. 3. A piston 34 is fixed to the rod 20 to operate in the cylinder 30. The locking type nut 28 is provided in the threaded outer end of the pawl rod, to prevent engagement of the pawl rod with the actuator rod 15 in the event of spring failure.

The pawl rod 20 is formed with an enlarged portion 36 to provide a shoulder 37 against which the compression spring 27 bears, as shown in FIG. 3, and the bore 25 has a plurality of O-rings 38 which provide a seal about the portion 36 to insure against leakage of the fluid pressure in the cylinder 30. The piston 34 is also provided with sealing rings 39.

Air or hydraulic fluids are introduced under pressure into the cylinder 30 through a flexible conduit 35 from a source (not shown) to actuate the piston 34 to engage the pawl rod with the brake actuator rod 15, and the spring 27 returns the piston to its normal position to release the pawl rod 20 from the serrated brake actuator rod 15 when the fluid pressure is relieved.

The invention is designed primarily for installation on vehicles having a pneumatic braking system, but it may obviously be employed in hydraulic systems if desired. It is to be understood that the term "fluid," as used herein, includes both compressed air and hydraulic fluids.

EMBODIMENT OF FIGS. 4 AND 5

Figure 4:
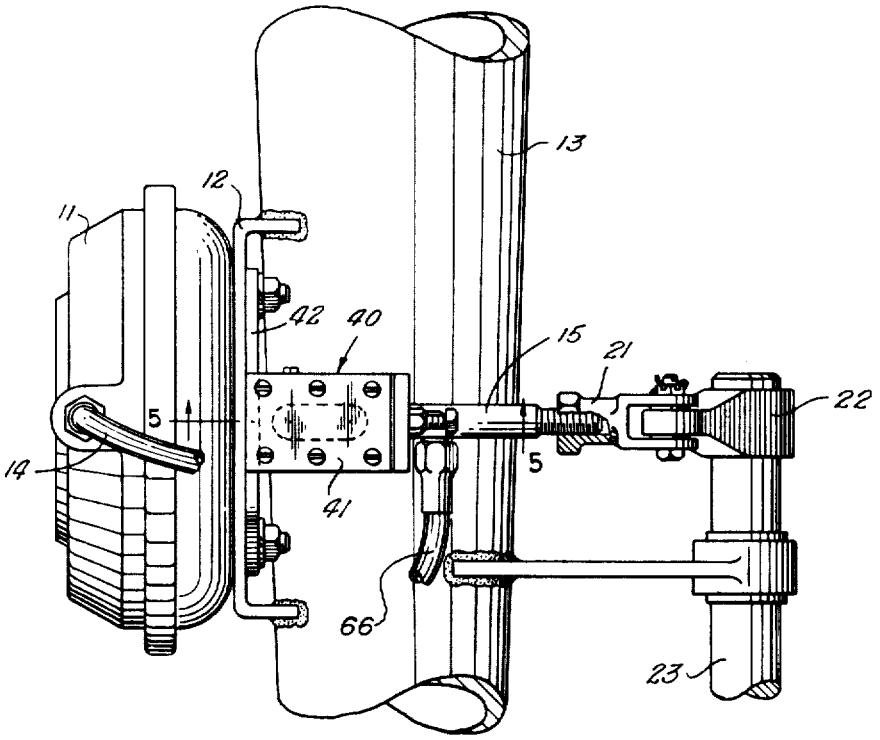
FIG. 4 is a fragmentary plan view similar to FIG. 3 but showing the housing for a modified form of brake locking mechanism; [and]
Figure 5:
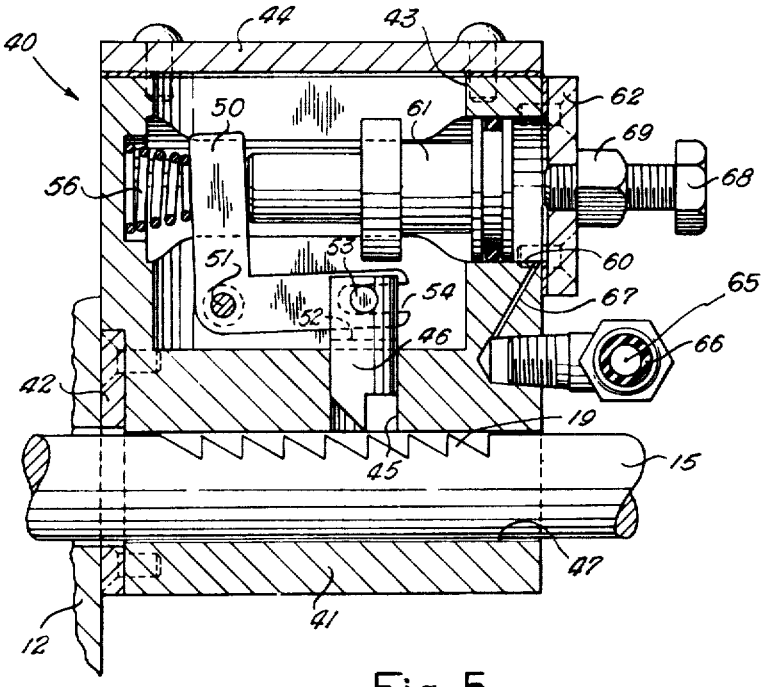
FIG. 5 is a sectional view taken in the plane 5—5 of FIG. 4 showing the details of the modified form of brake locking mechanism[.]; *and*

FIGS. 4 and 5 of the drawing illustrate a preferred form of brake locking unit 40 according to the invention, for use with a conventional brake setting system as above described. In the following description, the same reference numerals will be used for the above described elements of the conventional braking system.

As best seen in FIG. 4, this preferred form of locking mechanism or unit 40 is housed within a casing 41 having a mounting bracket 42 secured thereto. By means of the bracket 42, the unit 40 is secured to the axle mounting bracket 12 in association with the brake actuator chamber 11 in the manner described with respect to the embodiment of FIGS. 1, 2 and 3.

Referring to the orientation of the unit 40 as illustrated in the figures, the casing 41 is provided with a transverse bore 47 adjacent to its lower edge, which guides and supports the brake actuator rod 15 in the manner described; and the brake actuator rod includes rack teeth 19 on the portion of the rod which remains within the bore 47. The upper portion of the casing is provided with a chamber 43 which opens to the top of the casing, with the chamber being closed by a top plate 44 secured by means of screws for example. A second bore 45 is transverse to the bore 47, and communicates the bore 47 with the chamber 43. A pawl rod 46 is disposed for vertical reciprocating movement within the bore 45, and includes at its lower end a wedge-shaped pawl for engagement with the actuator rod rack teeth 19.

A crank arm 50, having a lower horizontal arm and an upward extending vertical arm, is pivotally mounted within the chamber 43 by means of a pivot pin 51; and the crank arm is coupled to the pawl rod in the manner that oscillation of the crank arm produces corresponding reciprocation of the pawl rod 46. To [affect] *effect* this coupling, the pawl rod is provided with an axial slot 52 at its upper end which is traversed by a pin 53. The pawl rod slot is dimensioned to receive the distal end of the crank horizontal arm, and this arm is provided with a horizontal slot 54 to receive the pin 53. With this arrangement, any vertical oscillation of the distal end of the horizontal crank arm will result in corresponding vertical movement of the pawl rod 46.

The pawl rod is normally urged downwardly to engage the actuator rod teeth 19 by means of a compression spring 56, which is seated in a suitable casing recess opening from the chamber 43 and which bears against the vertical arm of the crank arm 50 to urge the crank arm in a clockwise direction.

To rotate the crank arm in a counterclockwise direction, the casing 41 is provided with a transverse cylindrical bore 60 which defines the cylinder chamber for a spool-like piston element 61. The cylinder bore 60 opens to a side wall of the casing and is closed by a cylinder plate 62 secured to the casing by means of suitable screws for example, with the cylinder pressure chamber being defined by the bore 60 and the plate 62. The piston element 61 includes an axial extension 63 which bears against the crank vertical arm opposite from the spring 56. For communicating fluid to the cylinder chamber, the casing includes a threaded inlet chamber 65 for receiving the coupling of a flexible conduit 66; and a restricted passage 67 communicates the inlet chamber 65 with the cylinder bore 60 adjacent to the outer wall; this passage 67 providing for restricted flow of fluid into the cylinder chamber.

The cylinder plate 62 is provided with a central threaded hole for accommodating an adjustment screw such as a cap screw 68 carrying a lock nut 69. This adjustment screw is provided to manually move the piston 61 to the left to effect disengagement of the pawl rod from the actuator rod in the event of failure of the fluid system.

OPERATION

Figure 6:
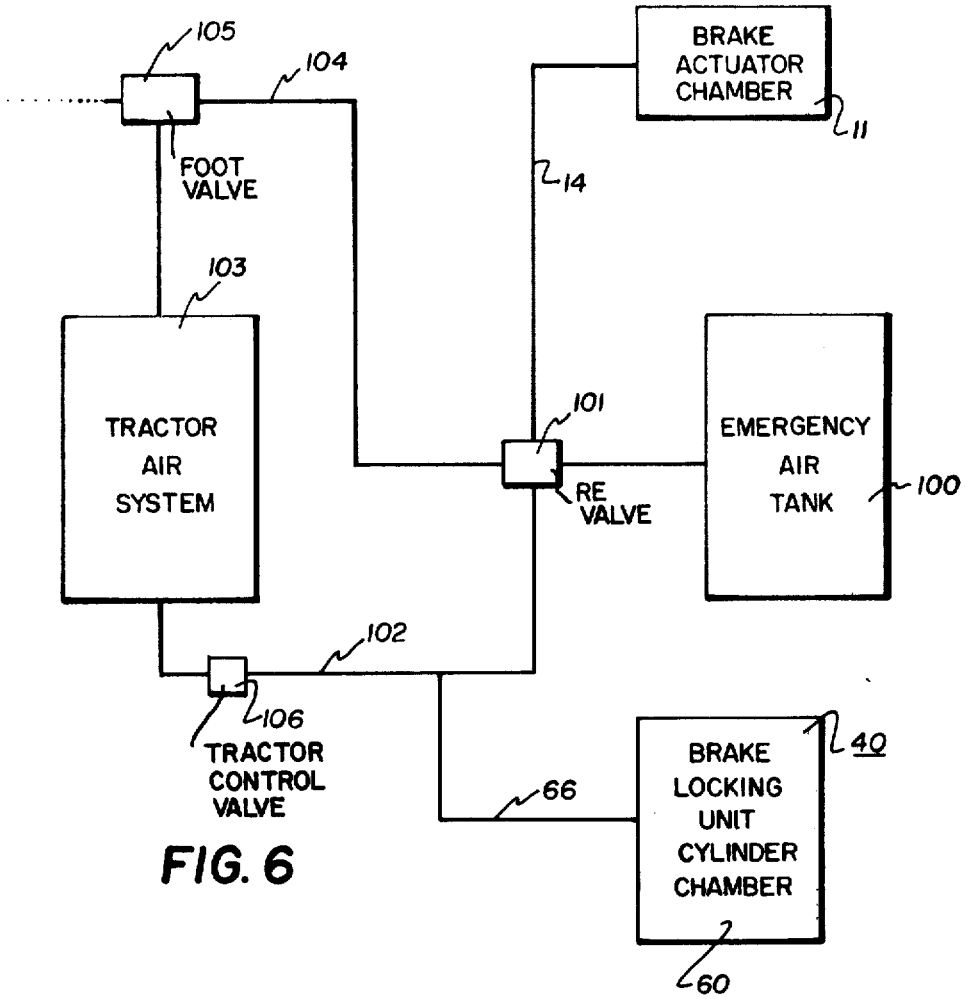
*FIG. 6 is a block diagram illustrating the interconnection of the brake locking mechanism shown in FIGS. 4 and 5 with a pneumatically operated brake system, in accordance with the present invention.*

The operation of the above described brake locking unit will now be described *with reference to FIG. 6*, assuming that a pneumatic braking system is used. Reference will also be made to a typical system for a semi-trailer, wherein the trailer braking system includes an emergency air tank or reservoir *100* which is supplied with compressed air from the tractor air system *103* through an RE (relay-emergency) valve *101* and an emergency line *102* which is coupled to the tractor air system *103* through a disconnect coupling. The several wheel unit brake actuator chambers 11 are connected *by way of conduit 14* to a service line *104* through the RE valve; with the service line *104* again being connected to the tractor system *103* through a disconnect coupling, to be pressurized by actuation of the tractor service brake valve *105* (foot valve). In normal operation of the trailer brakes, the RE valve serves as a relay valve to direct the pressurized air to the brake actuator chambers 11. When the emergency line *102* is opened for any reason, the RE valve *101* is actuated to supply compressed air from the trailer emergency reservoir to the trailer actuator chambers 11 to set the brakes.

Referring now to a wheel brake assembly which includes a locking unit 10 of FIG. 3, the locking pawl is normally disengaged from the actuator rod 15 by the spring 27; and the locking pawl is set by supplying pressurized air to the cylinder chamber. For operation of these units then, the conduits 35 for the several locking units 10 may be conveniently connected to the air line which communicates the RE valve with the brake actuator chambers 11; and this connection should be made through a three-way shutoff valve which serves in the open condition to direct compressed air from the RE valve to the locking unit chambers, and which serves in the closed condition to shut off the supply of air and to vent the cylinder chambers of the locking units 10.

This arrangement will prevent operation of the locking units during normal operation of the service brakes when the trailer is coupled to a tractor. When the trailer is disconnected from the tractor, the service brakes are set from the emergency reservoir; and the shutoff valve is then opened to pressurize the chambers of the units 10. When the trailer is again hooked up to a tractor for normal operation, the shutoff valve must be first closed to vent the locking unit chambers and condition the locking units for release of the pawls by the respective springs.

With this system the pawls are maintained engaged by the pressure from the trailer emergency reservoir; and should this pressure reduce to an extent to allow the pawl rods to retract this pressure reduction will also permit some movement of the brake actuator rod to the left creating back pressure on the pawl to maintain the pawl in engagement with the rack teeth by friction. To assist in this action, the faces of the rack teeth may be reversely inclined with the face of the pawl having a complementary inclined face to effectively lock the pawl rod and actuator against disengagement.

Referring now to the unit 40 of FIGS. 4 and 5, in the normal condition of the locking unit the spring 56 effects engagement of the pawl with the actuator rod 15. For the operation of these units 40 then, the respective supply conduits 66 may be conveniently connected to the above described trailer emergency line *102 (FIG. 6)*. With such arrangement whenever the emergency line is pressurized, the cylinder chambers of the locking units will also be pressurized to disengage the pawl rods 46. This of course would be the normal condition when the trailer is coupled to a tractor. Whenever the emergency line *102* is vented, either through a suitable tractor control valve *106*, through breaking the tractor-trailer coupling, or due to a break in the emergency line *102*, the locking unit chambers are vented to permit the setting of the pawls and simultaneously the trailer brakes are set through the emergency reservoir and the RE valve. To prevent engagement of the pawls with the actuator rod until such time as the brakes are fully set, the restricted passage 67 retards the flow of pressurized air from the cylinder chamber to atmosphere through the conduit 66. With the brake locking units 40, the lock is maintained by the force of the spring 56; and the trailer brakes will remain locked indefinitely regardless of any loss of pressure from the system.

What has been described are two forms of brake locking units or mechanisms for use with conventional braking systems which are simple and rugged in construction, and which are simple and reliable in operation, and which may be readily adapted for use with the braking systems on existing vehicles. Because of the simplicity of construction, the units can be made available to operators of trucking lines or other heavy duty vehicles at a reasonable cost. A particular advantage of the system of FIGS. 4 and 5 is that the unit can be readily controlled by the existing air brake system, and the locking device once set is independent of the air system and will hold the brakes for an indefinite period.

A particular advantage of the above described locking system is its simplicity and lack of heavy parts. This means that the brake locking units which must be added to each wheel unit are much lighter in weight than so-called spring brakes which serve this function, and thereby reducing dead weight which otherwise would have to be hauled every mile of operation. Another important feature, resulting from simplicity of design and operation, is the reduction of installation and maintenance costs for brake locking systems.

While preferred embodiments of the invention have been illustrated and described, it will be understood by those skilled in the art that changes and modifications may be resorted to without departing from the spirit and scope of the invention.

What is claimed is:

[1. In a fluid operated brake setting system for heavy vehicles including, for each wheel unit, a brake, a brake actuator chamber and a brake actuator rod reciprocated by said actuator chamber and operatively connected to the wheel unit brake; a brake locking mechanism comprising:

a casing adapted to be mounted in association with said actuator chamber; said casing having a first passage therethrough, for accommodating the brake actuator rod for reciprocating movement, and a second passage transverse to and communicating with said first passage;

said brake actuating rod being provided with longitudinally spaced transverse rack teeth; a pawl rod supported and guided for reciprocating movement in said second passage, having pawl means at one end for engagement with said rack teeth;

means in said casing defining a cylinder chamber; piston means disposed in said cylinder chamber for reciprocating movement; means coupling said piston means to said pawl rod;

spring means coupled to said pawl rod, normally urging said pawl rod in a first direction relative to said first passage to engage said pawl means with said rack teeth; conduit means communicating said cylinder chamber with a source of pressurized fluid acting on said piston and urging said pawl rod in a second direction relative to said first passage to disengage said pawl means from said rack teeth.]

2. A brake locking mechanism as set forth in claim [1] *11* said coupling means comprising a crank arm pivoted within said casing; one end of said crank arm being coupled to said pawl rod to provide for reciprocation of said pawl rod in response to oscillation of said crank arm; said piston means acting on the other end of said crank arm.

3. A brake locking mechanism as set forth in claim 2 said piston means being moved, upon the introduction of fluid into said cylinder chamber, from a first position to a second position to disengage said pawl means from said actuator rod; a threaded hole in the casing wall confronting the head of said piston; and an adjusting screw disposed in said hole for maintaining said piston in said second position to disengage said pawl means from said actuator rod.

4. A brake locking mechanism as set forth in claim 2 said spring means acting on said other end of said crank arm, in opposition to said piston means, to normally engage said pawl means with said actuator rod.

5. A brake locking mechanism as set forth in claim [1] *11* restricted passage means in said casing communicating said cylinder chamber with a fluid inlet chamber to restrict the rate of fluid flow into and out of said chamber.

*6. In a pneumatically operated brake system for applying and releasing a wheel brake of a wheeled vehicle, said brake system being of the type including a primary air source; a brake actuator chamber; a brake actuator rod operatively connected with said brake actuator chamber and said wheel brake and mounted for reciprocating movement to apply said wheel brake in response to the pressurization of said actuator chamber from said primary air source; and foot-operated valve means for supplying air from said periphery source to said actuator chamber; the improvement consisting of an auxiliary brake setting and locking mechanism for applying as well as maintaining said brake against release, independent of the operation of said foot-operated valve means, said auxiliary brake setting and locking mechanism comprising:*

*(a) a casing mounted in association with said brake actuator chamber; said casing having a first passage therethrough for accommodating the reciprocating movement of said brake actuator rod and a second passage transverse to, and communicating with, said first passage;*

*(b) said brake actuator rod being provided with longitudinally spaced transverse rack teeth; a pawl rod supported and guided for reciprocating movement in said second passage and having pawl means at one end for engagement with said rack teeth;*

*(c) means on said casing defining a cylinder chamber; piston means disposed in said cylinder chamber for reciprocating movement; means coupling said piston means to said pawl rod whereby air pressure within said cylinder chamber acts upon said piston to urge said pawl rod in a first direction relative to said first passage to disengage said pawl means from said rack teeth when the said air pressure is at least equal to a predetermined amount, thereby preventing the locking of said wheel brake by engagement of said pawl rod with said brake actuator rod;*

*(d) spring means coupled to said pawl rod normally urging said pawl rod in a second direction opposite to said first direction to engage said pawl means with said rack teeth when the air pressure within said cylinder chamber is below said predetermined amount;*

*(e) means for maintaining said predetermined amount of air pressure within said cylinder chamber when said actuator chamber is pressurized from said primary air source, and*

*(f) means for pressurizing said actuator chamber as well as reducing the air pressure in said cylinder chamber below said predetermined amount in response to loss of air pressure from said primary air source, thereby to apply said wheel brake independent of the operation of said foot-operated valve means and lock said wheel brake in said applied position by engagement of said pawl rod with said brake actuator rod.*

*7. The improvement as defined in claim 6 further including means simultaneously supplying air of at least said predetermined amount of air pressure to said cylinder chamber from said primary air source during the pressurization of said actuator chamber from said primary air source; an emergency air source; and means responsive to the loss of air pressure from said primary air source below said predetermined amount to pressurize said actuator chamber from said emergency air source and enable locking engagement of said pawl rod with said brake actuator rod.*

*8. The improvement as defined in claim 7 further including controllable valve means for providing said loss of air pressure from said primary air source.*

*9. The improvement as defined by claim 8 further including means for manually disengaging said pawl rod from said brake actuator rod.*

*10. In a pneumatically operated brake system for applying and releasing a wheel brake of a wheeled vehicle, said brake system being of the type including a primary air source; a brake actuator chamber; a brake actuator rod operatively connected with said brake actuator chamber and said wheel brake and mounted for reciprocating movement to apply said wheel brake in response to the pressurization of said actuator chamber from said primary air source; and foot-operated valve means for supplying air from said primary source to said brake actuator chamber; the improvement consisting of an auxiliary brake setting and locking mechanism for applying as well as maintaining said brake against release, independent of the operation of said foot-operated valve means, said auxiliary brake setting and locking mechanism comprising:*

*(a) means for accommodating the reciprocating movement of said brake actuator rod;*

*(b) means supporting and guiding a pawl rod for reciprocating movement in a direction transverse to said brake actuator rod, said pawl rod having means at one end thereof for engagement with said brake actuator rod;*

*(c) means defining a cylinder chamber; piston means disposed in said cylinder chamber for reciprocating movement; means coupling said piston means with said pawl rod whereby air pressure within said cylinder chamber acts upon said piston to urge said pawl rod in a first direction away from said brake actuator rod when the said air pressure is at least equal to a predetermined amount, thereby preventing the locking of said wheel brake due to engagement of said pawl rod with said brake actuator rod;*

*(d) spring means coupled to said pawl rod normally urging said pawl rod in a second direction opposite to said first direction, thereby to engage said pawl rod with said brake actuator rod when the air pressure within said cylinder chamber is below said predetermined amount;*

*(e) means maintaining said predetermined amount of air pressure within said cylinder chamber when said*

*actuator chamber is pressurized from said primary air source, and*

*(f) means for pressurizing said brake actuator chamber as well as reducing the air pressure in said cylinder chamber below said predetermined amount in response to a loss of air pressure from said primary air source, thereby to apply said wheel brake independent of the operation of said foot-operated valve means and lock said wheel brake in said applied position by engagement of said pawl rod with said brake actuator rod.*

*11. In a pneumatically operated brake system for applying and releasing a wheel brake of a wheeled vehicle; said brake system including a primary air source, a brake actuator chamber, a brake actuator rod operatively connected with said brake actuator chamber and said wheel brake and mounted for reciprocating movement to apply said wheel brake in response to the pressurization of said brake actuator chamber from said primary source, and foot-operated valve means for supplying air from said primary source to said actuator chamber; the improvement consisting of an auxiliary brake locking mechanism for applying as well as maintaining said brake against release, independent of the operation of said foot-operated valve means, said brake locking mechanism comprising:*

*(a) a casing mounted in association with said brake actuator chamber, said casing having a first passage therethrough for accommodating the reciprocating movement of said brake actuator rod and a second passage transverse to, and communicating with, said first passage;*

*(b) said brake actuator rod being provided with longitudinally spaced transverse rack teeth; a pawl rod supported and guided for reciprocating movement in said second passage and having pawl means at one end for engagement with said rack teeth;*

*(c) means in said casing defining a cylinder chamber; piston means disposed in said cylinder chamber for reciprocating movement; means coupling said piston means to said pawl rod whereby air pressure within said cylinder chamber acts upon said piston to urge said pawl rod in a first direction relative to said first passage to disengage said pawl means from said rack teeth when the said air pressure is at least equal to a predetermined amount, thereby preventing the locking of said wheel brake by engagement of said pawl rod with said brake actuator rod; and*

*(d) spring means coupled to said pawl rod normally urging said pawl rod in a second direction opposite to said first direction to engage said pawl means with said rack teeth when the air pressure within said cylinder chamber is below said predetermined amount.*

* * * * *

UNITED STATES PATENT OFFICE

CERTIFICATE OF CORRECTION

Patent No. Re. 29,913 Dated Feb. 20, 1979

Inventor(s) WALTER CASE and WILLIAM F. BENEFIELD

It is certified that error appears in the above-identified patent and that said Letters Patent are hereby corrected as shown below:

Column 7, Line 34: "periphery" should be "primary"

Signed and Sealed this

*Seventh* Day of *August 1979*

[SEAL]

*Attest:*

*Attesting Officer*

LUTRELLE F. PARKER

*Acting Commissioner of Patents and Trademarks*